United States Patent

[11] 3,592,219

[72] Inventor Elroy J. Giese
 Cleveland, Ohio
[21] Appl. No. 821,759
[22] Filed May 5, 1969
[45] Patented July 13, 1971
[73] Assignee Tomlinson Industries, Inc.
 Cleveland, Ohio

[54] CAM-OPERATED VALVE WITH SCRAPING VANES
 13 Claims, 5 Drawing Figs.

[52] U.S. Cl. ................................................. 137/242,
 137/244, 251/254, 137/614.2, 137/614.21,
 137/329.3, 137/329.4
[51] Int. Cl. ....................................................F16k 29/00,
 F16k 51/00
[50] Field of Search............................................ 251/255,
 254, 253, 252, 251, 262, 263; 137/244, 242,
 614.2, 614.21, 543.13, 543.17, 543.19, 543.21,
 636.2—636.4

[56] References Cited
 UNITED STATES PATENTS

| | | | |
|---|---|---|---|
| 1,172,900 | 2/1916 | Payne............................ | 251/253 |
| 1,529,222 | 3/1925 | Spence........................... | 251/254 |
| 1,577,242 | 3/1926 | Andersen....................... | 137/242 X |
| 2,189,235 | 2/1940 | Wanner.......................... | 137/242 |
| 2,201,095 | 5/1940 | Kaufman........................ | 251/254 |
| 2,310,485 | 2/1943 | Wyckoff........................ | 251/253 X |
| 2,847,027 | 8/1958 | Kumpman..................... | 137/636.2 X |
| 3,094,145 | 6/1963 | Chernak........................ | 137/614.2 |

Primary Examiner—Clarence R. Gordon
Attorney—Fay, Sharpe and Mulholland

ABSTRACT: This invention relates to a valve particularly adapted for use in controlling flow through water feed lines for commercial coffee urns. The valve includes a valve body having an inlet and an outlet interconnected by a fluid passageway. Intermediate the ends of the passageway is a shoulder or partition, apertured to permit flow therethrough. A handle operates to open and close the valve by reciprocating a stem which extends into the passageway through an opening in the valve body. On the inner end of the stem is attached a resilient closure member adapted to engage a first sealing seat provided on one side of the partition and encircling the aperture through such partition. Received over the closure member is a cuplike shield which covers a major portion of the closure member. Disposed above the shield and circumscribing the stem is a stem guide having a plurality of vanes radiating outwardly from the stem. The stem guide centers the stem and, by rotation of the vanes, produces a scraping action which helps to reduce "liming" of certain interior valve surfaces. The stem is biased downwardly toward the first sealing seat by a spring which is compressed between the top of the stem guide and the undersurface of a bonnet nut through which the stem passes. The valve may also include an antisiphon control assembly which acts in concert with a second sealing seat encircling the aperture on the other side of the partition. The antisiphon control assembly may be either manually or automatically actuated.

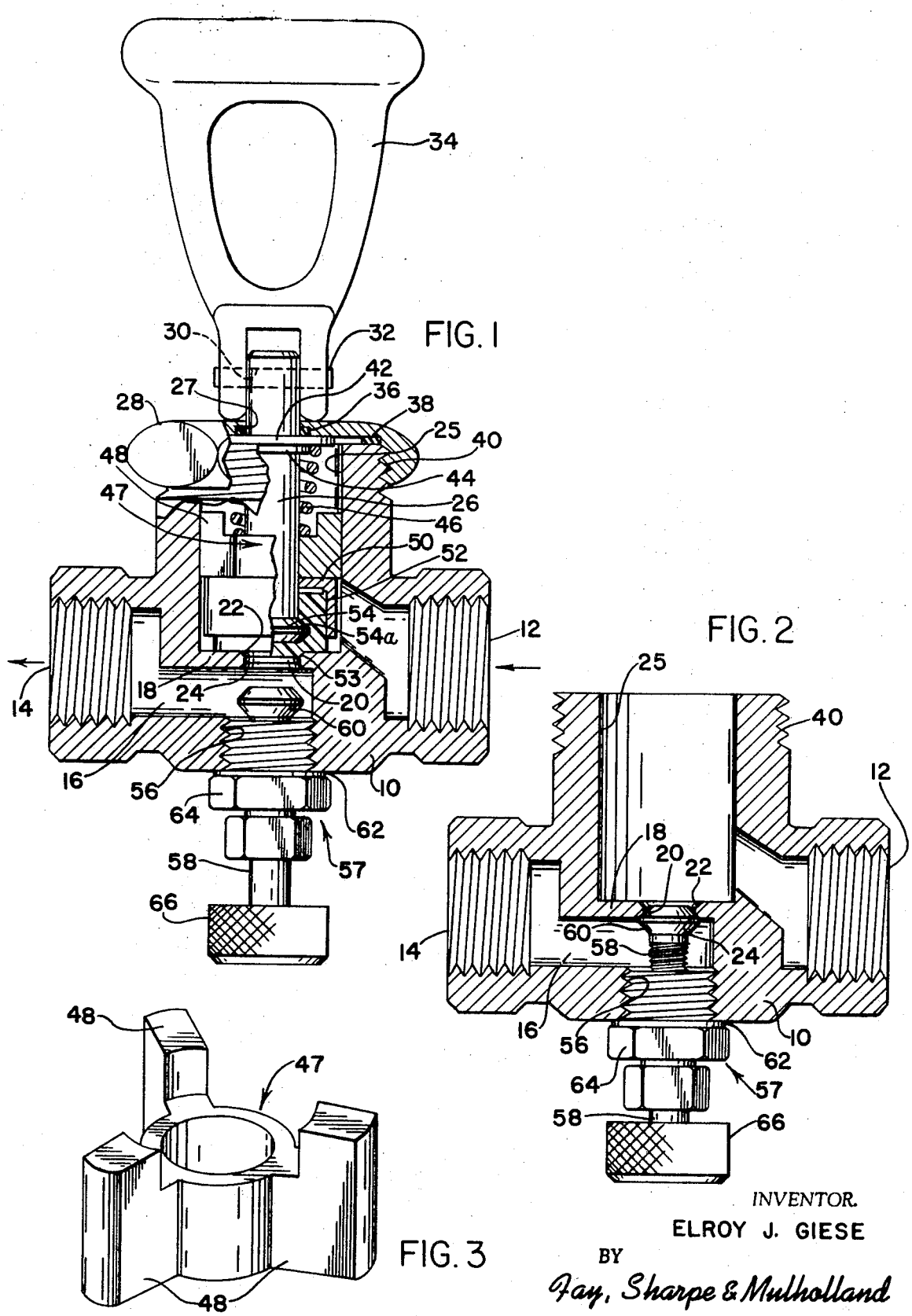

INVENTOR.
ELROY J. GIESE
BY
Fay, Sharpe & Mulholland
ATTORNEYS

CAM-OPERATED VALVE WITH SCRAPING VANES

BACKGROUND OF THE INVENTION

Urns for the commercial production of coffee, tea and other liquid foods are normally rather substantial devices permanently installed at an appropriate location within the restaurant or other facility in which they are used. Because of the permanence of the installation and also for efficiency in the brewing of the liquid food, feed water used in the production process in ordinarily piped directly to these urns.

For obvious reasons, it is necessary that the line through which water is piped to the urn be equipped with an appropriate valving mechanism to regulate the flow of feed water to the urn. While the present valve is readily adapted for use in numerous other applications, it is for this specific purpose that it is particularly well suited.

"Water inlet valves," as they are popularly known, must satisfy a number of parameters which often prove rather demanding and sometimes even at cross-purposes to one another. At the outset, of course, is the matter of economy in manufacture. Because of the nature of the application to which such valves are put, it is not possible to justify, from a cost standpoint, the use of features common to the more sophisticated and expensive valves used for handling high-pressure fluids. Yet, the pressure levels experienced by water inlet valves are sufficiently elevated that much of the technology developed in connection with the relatively inexpensive "gravity feed" valving systems common to the liquid food industry becomes no longer applicable.

Illustrative of the point is the problem of seal erosion. To obtain satisfactory sealing characteristics at the working pressures experienced by valves of the character with which the invention is concerned, it is normally necessary to employ a resilient closure member of rubber or the like. Under gravity feed conditions such members have established a highly satisfactory record of accomplishment.

However, at feed line pressure levels, flow impinges on the closure member with such force as to cause rapid erosion of the member and resultant seal failure. Various shielding devices have been developed in the past (see U.S. Pat. No. 3,094,145) but these have been largely unsuccessful because they produce an undesirable reduction in flow rate through the valve.

A collateral effect of the higher pressure with which water inlet valves must be used is the tendency of forces generated by the pressurized fluid to cant or cock the valve stem. This phenomenon causes the closure member to become dislodged from the valve seat with consequent failure of the seal. Appropriate stem-guiding means is, therefore, indicated where in gravity feed systems none was necessary.

There is also the problem of "liming" or, more precisely, the buildup of certain mineral deposits on the interior surfaces of the valve. These deposits are normally comprised essentially of calcium, aluminum and magnesium carbonates which precipitate out of solution and adhere to the wetted surfaces of the valve. The rate at which liming occurs is faster at higher temperatures than at lower ones and, hence, in applications such as the present one, can become quite acute because of the heat generated by the urn and transmitted to such lines. Liming may prove particularly bothersome in the vicinity of the valve actuating and biasing mechanism because buildup of deposits may interfere with proper operation of that mechanism. Previous designs have failed to provide means for inhibiting development of this condition.

Insofar as valve maintenance is concerned, the desirability of a design which lends itself to servicing without the necessity for first draining the urn to which the valve is attached is obvious. Here again, most prior developments have failed adequately to provide means for so doing or have done so in the context of a design which is otherwise unacceptable.

Finally, from the standpoint of operating efficiency, a truly excellent water inlet valve should be capable of swift, positive operation. Unfortunately, too many proposals of the past have included the use of threaded, rotating stems which require entirely too much time to move from open to closed position, or vice versa.

BRIEF DESCRIPTION OF THE INVENTION

This valve includes a housing or valve body having an inlet and an outlet interconnected by a fluid passageway. Intermediate the ends of the passageway is a shoulder or partition having an aperture therethrough. The aperture is substantially coaxial with an opening or bore which at one end intersects the passageway and at the other opens to the exterior of the valve body. The opening receives a primary sealing mechanism including a valve stem which at its inner end may terminate in a bead or enlargement which serves to secure a resilient closure member to the stem. That member is adapted intermittently to seat against a first sealing seat provided on one side of the partition and encircling the aperture. Enveloping the closure member and covering the majority of the outer surface thereof is a cuplike shield which protects the closure member from the effects of rapid impinging fluid flow when the valve is opened.

Adjacent the shield and received about the stem is a stem guide having a plurality of vanes radiating outwardly therefrom. The vanes closely engage the wall defining the opening or bore and are adapted, on rotation of the stem guide, to scrape or burnish such wall, thus to prevent or impede buildup of mineral deposits. Compressed between the stem guide at one end and a retainer or collar at the other and in force-transmitting relationship with the stem is a suitable spring-biasing means for urging the closure member toward the first sealing seat. A bonnet threaded to the housing closes the outer end of the opening or bore and serves to retain the valve stem, closure member, stem guide and spring in the valve body. The stem projects through a central aperture in the bonnet and is attached at its upper end to a cam handle or other actuating means which is adapted to be used in opening or closing the valve to flow.

A second sealing seat may be provided on the partition on the opposite side from the first sealing seat and in surrounding relationship to the aperture. The second seat provides a sealing surface for an antisiphon control assembly which may be carried in a second opening in the valve body. This assembly may be utilized to prevent flow through the valve following removal for repair purposes of the primary sealing mechanism. The antisiphon control assembly may be so designed as to be manually operable or, in the alternative, may be of the automatically operable variety.

BRIEF DESCRIPTION OF THE DRAWINGS

FIG. 1 is an elevational view, partially in section, of a valve incorporating the principles of this invention;

FIG. 2 is an elevational view, partially in section, of the valve body of FIG. 1 with the antisiphon valve closed;

FIG. 3 is a perspective view, in enlarged scale, of the stem guide component;

PREFERRED EMBODIMENT

Figure 4:
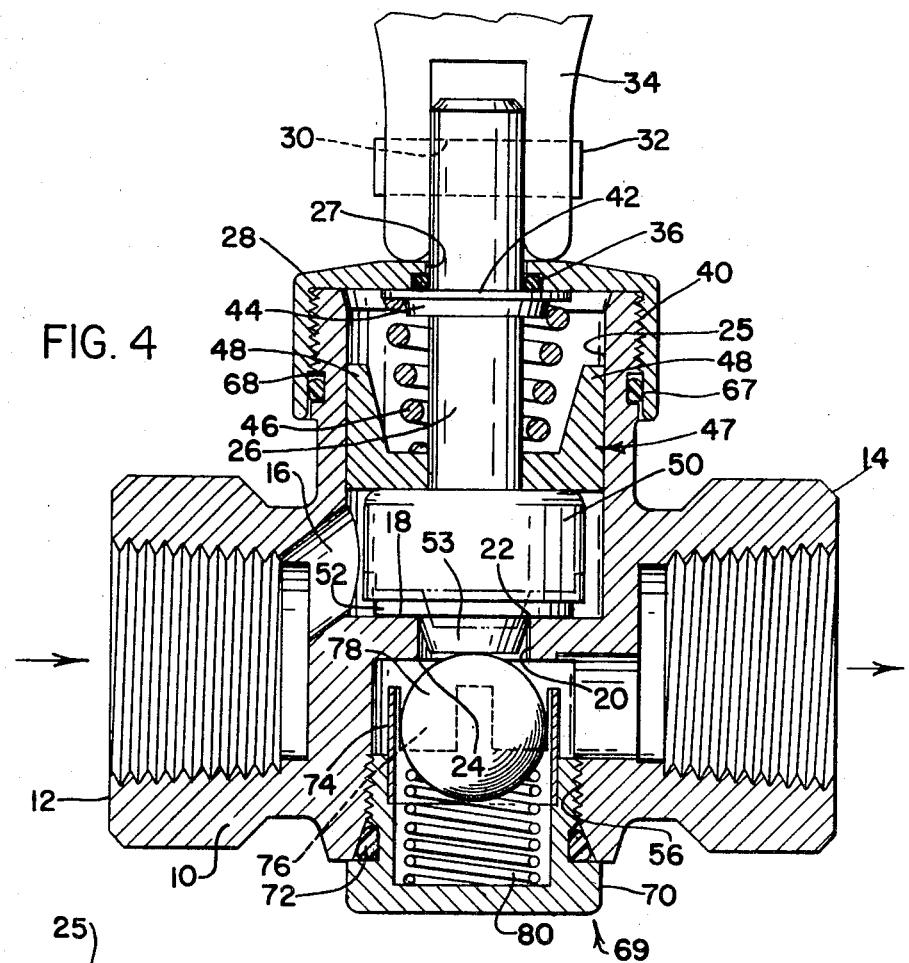
FIG. 4 is a fragmentary elevational view, partially in section, of a valve having a modified antisiphon closure.
Figure 5:
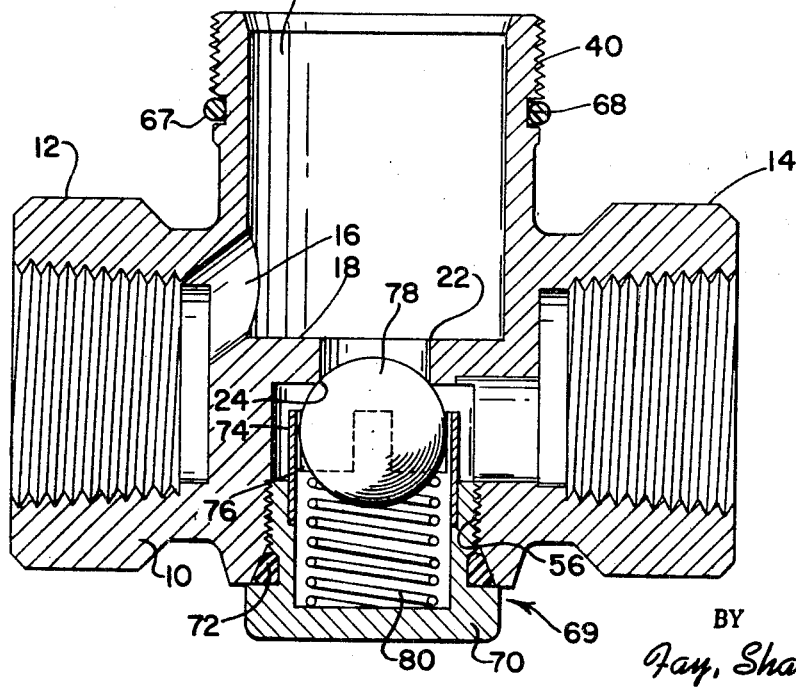
FIG. 5 is an elevational view, partially in section, of the valve body of FIG. 4 with the antisiphon control assembly closed.

This invention relates to a water inlet valve of the type described and includes a valve body 10 providing an inlet 12 and an outlet 14. A fluid passage 16 interconnects the inlet and the outlet, and disposed across the passage intermediate its ends is a shoulder or partition 18 having a centrally located aperture 20 therethrough. Encircling the aperture 20 on each side of the partition are a first sealing seat 22 and a second sealing seat 24, as best seen in FIG. 1. The aperture 20 is substantially coaxial with an opening or bore 25 extending into the valve body from the exterior. The bore 25 contains a primary sealing mechanism which includes a stem 26 extending upwardly along the axis of the bore and outwardly through a central aperture 27 in bonnet nut 28 threaded to the valve body at 40. The outer end of the stem has a hole 30 therethrough for receiving a handle-attaching pin 32 by which a cam handle 34 or other actuating means is pivotally secured to the stem.

Provided for cooperation with the bonnet 28 are multiple sealing means, an O-ring or first seal 36 which serves as a seal between the stem 26 and the bonnet, and a bonnet gasket or second seal 38 which serves as a seal between the bonnet and the valve body.

Engaging the under surface of the bonnet and surrounding the stem is a retainer or collar means 42. The retainer carries a boss 44 concentric with the stem 26 which acts as a centering means for biasing spring 46. Helically wound around the stem, the spring 46 urges the stem toward the first valve sealing seat 22. The lower end of the spring 46 engages a stem guide 47 received loosely over the stem and having vanes 48 which radiate outwardly from the axis of the stem into sliding engagement with the wall of bore 25, thus to support the inner end of the stem against lateral deflection. The detailed structure of the stem guide 47 is best seen in FIG. 3.

Obviously, as the stem reciprocates, the stem guide 47 does the same. Further the frictional forces set up between the stem guide, the stem and the other components carried on the stem are sufficiently great that rotation of the stem imparts similar motion to the guide. The vanes thereupon operate to scrape the walls of the bore 25 reasonably clean of mineral deposits, thus to maintain critical areas of the valve in a relatively "lime" free condition.

The underside of stem guide 47 abuts cuplike shield 50 received in inverted fashion about the inner end of the stem. Shield 50 envelops telescopically a resilient closure member 52 of suitable elastomer or the like mounted removably on the inner end of the stem by bead 54 or other means which mates with a corresponding cavity 54a in the closure member 52. When the valve is closed, the first sealing seat 22 is engaged by a cooperatively shaped portion or nose 53 of the closure member to prevent flow through the valve.

Optionally, a second valve-closing means may be inserted through another opening 56 disposed on the opposite side of the partition 18 to seat 22. The second valve-closing means is an antisiphon control assembly 57 which may be manually operated as illustrated in FIG. 1 or an automatic closing device 69 as shown in FIG. 4. In FIG. 1, the antisiphon stem 58 includes an enlargement 60 on its inner end which seals against the second valve seat 24.

The stem 58 is threaded through a male nut 64 which, in turn, is threadedly received in a mating aperture 56 in the valve body 10. On the outer end of the stem 58 is a knurled handle 66 which may be manually rotated to close the antisiphon device. The function of this antisiphon control assembly will be explained subsequently.

Referring now to FIG. 4 which shows a modified valve structure, it is seen that the means for sealing between the valve body and the bonnet is in the form of an O-ring 67 disposed in a circumferential groove 68 provided in the exterior surface of the valve body 10. The significance of this arrangement lies in the fact that it permits the bonnet to be moved forward and back along the threads on the body at 40 without disrupting the seal between these elements. Such adjustment may prove necessary in order to regulate the degree of insertion of the stem into the body for the purpose of insuring fluidtight engagement between closure member 52 and seat 22.

FIG. 4 is also distinguished from FIG. 1 in that an automatically closing antisiphon means 69 is substituted for the manually operated means of FIG. 1. In the FIG. 4 structure a cap 70 is threaded into the valve opening 56 and an O-ring 72 serves as a sealing means between the cap and the valve body 10. A cap extension 74 has a plurality of upwardly opening slots 76 which will be explained subsequently. The second sealing seat 24 is abutted in this case by a ball-type valving member 78 which is urged into sealing relationship by spring-biasing means 80. The valve body 10 of FIG. 1 shows the flow from right to left while FIG. 4 shows the flow from left to right.

Turning now to the operation of the device, the valve of FIG. 1 is first actuated by rotating the knurled handle 66 to open the antisiphon control assembly 57. Then the cam handle 34 is moved about its pivot point to raise the closure member 52 from the first sealing seat 22, thus permitting fluid to flow through the passageway 16. At such time as an adequate amount of fluid has passed through the valve, the cam handle 34 may be released allowing the closure member 52 to reengage the first sealing seat 22 thus to terminate flow.

In the event it is desired to remove the primary sealing assembly for cleaning or maintenance and without first draining the urn, one merely rotates the knurled handle 66 to urge the stem enlargement 60 into sealing engagement with the second sealing seat 24. At this time, through the use of suitable valving (not shown) flow is cut off upstream from inlet 12 and the bonnet 28 may then be removed together with the stem 26 and various other components carried by the stem. Following cleaning or repair, the valve may be reassembled and the bonnet tightened, at which time the antisiphon control assembly may again be withdrawn from its seat by rotating handle 66. The valve at this point is again ready for operation.

Concerning the embodiment of FIG. 4, when the valve is opened, the pressure generated by the fluid in the valve will force ball 78 away from seat 24, thus to permit flow. The cap extension 74 keeps the ball 78 properly aligned with valve seat 24 and the slots 76 allow free flow of the water. Immediately upon closing of the valve by the operation of stem 26, the pressure will be released from the inlet side and the bias of spring 80 will urge ball 78 into sealing engagement with the second valve seat 24. Then if any necessary repairs must be made, the stem 26 and bonnet 28 may be removed and the antisiphon control assembly will keep the valve passage 16 sealed against backflow from the urn.

For ease of description, the principles of the invention have been set forth in connection with but two illustrated embodiments. It is not intended that the illustrated embodiments nor the terminology employed in describing them be limited inasmuch as variations in these may be made by one of ordinary skill in the art without departing from the spirit of the invention. Rather, it is desired to be restricted only by the scope of the appended claims.

The invention I claim is:

1. A valve including a valve body having an inlet and an outlet, a fluid passageway interconnecting the inlet and the outlet,
an opening through the body into said fluid passageway,
a shoulder in the body blocking said passage, said shoulder having an aperture therethrough which is substantially coaxial with said opening,
a first sealing seat on one face of said shoulder around said aperture,
a reciprocable stem projecting through said opening and having an inner end terminating adjacent said first sealing seat on said shoulder,
a bonnet disposed around said stem and being attached to said body around said opening,
first means for sealing in fluidtight relationship between said stem and said bonnet,
second means for sealing in fluidtight relationship between said body and said bonnet,
a resilient closure member mounted upon said inner end of said stem,
a cuplike shield disposed in engaging relationship with said resilient closure member,
said closure member and said shield being engaged to reciprocate with said stem,
the surface of said closure member farthest from said shoulder being completely covered by said cuplike shield and said shield including a portion extending toward said shoulder thereby to provide a movable protective shield for a portion of the surface area of said resilient closure member, means for reciprocating said resilient closure member toward and away from said first sealing seat without rotating said stem, and means biasing said resilient closure member toward said first sealing seat, a centering and tilt-preventing means including vane means adapted to move with said resilient closure member and extending upwardly from said cuplike shield toward said bonnet, the vane means fitting closely within the wall defining the opening and being adapted to be rotated, thus to scrape and clean said wall.

2. The valve of claim 1 wherein the shoulder forms a partition and includes a second sealing seat, said second sealing seat being disposed around said aperture on the opposite face of said partition from the first sealing seat, and fluid shutoff means sealingly to engage said second sealing seat.

3. The valve of claim 2 wherein the shutoff means is biased toward said second sealing seat.

4. The valve of claim 2 wherein the shutoff means is adapted to be pushed into sealing engagement by manually operated means.

5. The valve of claim 1 wherein said second means for sealing is an O-ring positioned in a groove in the external surface of said body.

6. The valve of claim 1 wherein the resilient closure member includes a nose portion extending into said aperture.

7. The valve of claim 1 wherein the resilient closure member is caused to approach and recede from the first sealing seat by a handle pivotally attached to the outer end of said stem.

8. A valve including a valve body having an inlet and an outlet with an opening forming a fluid passageway therebetween;
a first sealing seat in said fluid passageway;
a reciprocable stem extending into said body and having an inner end terminating adjacent said first sealing seat;
a resilient closure member mounted upon said inner end of said stem for reciprocation therewith;
means biasing said resilient closure member toward said first sealing seat;
a centering and tilt-preventing means including vane means adapted to move with said resilient closure member and extending upwardly therefrom, said vane means fitting closely within the wall defining the opening and being adapted to be rotated, thus to scrape and clean said wall.

9. The valve of claim 8 wherein said centering and tilt-preventing means is rotatable relative to said resilient closure member.

10. The valve of claim 8 wherein said means biasing said resilient closure member also biases said tilt-preventing means toward said resilient closure member.

11. The valve of claim 8 wherein said centering and tilt-preventing means is movably mounted on said stem.

12. The valve of claim 8 including a cuplike shield disposed in engaging relationship with said resilient closure member.

13. The valve of claim 12 wherein the surface of said closure member farthest from said shoulder being completely covered by said cuplike shield and said shield including a portion extending toward said shoulder thereby to provide a movable protective shield for a substantial portion of the surface area of said resilient closure member.